United States Patent [19]

Mammano et al.

[11] Patent Number: 5,338,979
[45] Date of Patent: Aug. 16, 1994

[54] CONTROLLABLE BUS TERMINATOR

[75] Inventors: Robert A. Mammano, Costa Mesa, Calif.; Mark Jordan, Manchester, N.H.

[73] Assignee: Unitrode Corporation, Billerica, Mass.

[21] Appl. No.: 88,911

[22] Filed: Jul. 7, 1993

Related U.S. Application Data

[63] Continuation of Ser. No. 990,133, Dec. 14, 1992, abandoned, which is a continuation of Ser. No. 755,072, Sep. 5, 1991, Pat. No. 5,272,396.

[51] Int. Cl.$^5$ .......................... H03K 17/16; H03K 3/01
[52] U.S. Cl. .................................. 307/443; 307/296.1; 307/241
[58] Field of Search ................. 307/443, 147, 296.1, 307/296.2, 241, 243; 333/24 R

[56] References Cited

U.S. PATENT DOCUMENTS

| Re. 33,378 | 10/1990 | Mehl | 307/243 |
|---|---|---|---|
| 3,135,874 | 6/1964 | Lucas et al. | 307/243 |
| 3,155,963 | 11/1964 | Boensel | 307/243 |
| 4,220,876 | 9/1980 | Ray | 307/296.4 |
| 4,565,959 | 1/1986 | Nagano | 307/296.6 |
| 4,675,551 | 6/1987 | Stevenson et al. | 307/443 |
| 4,748,426 | 5/1988 | Stewart | 307/443 |
| 4,821,170 | 4/1989 | Bernick et al. | 364/200 |
| 4,831,283 | 5/1989 | Newton | 307/443 |
| 4,859,877 | 8/1989 | Cooperman et al. | 307/443 |
| 4,864,291 | 9/1989 | Korpi | 340/825.5 |
| 4,920,339 | 4/1990 | Friend et al. | 340/825.52 |
| 4,965,801 | 10/1990 | DuLac | 371/40.1 |
| 4,988,890 | 1/1991 | Narhi et al. | 307/147 |
| 5,029,284 | 7/1991 | Feldbaumer et al. | 307/443 |

Primary Examiner—Edward P. Westin
Assistant Examiner—Richard Roseen
Attorney, Agent, or Firm—Weingarten, Schurgin, Gagnebin & Hayes

[57] ABSTRACT

A controllable bus terminator for providing a switchable termination on a bus having a plurality of conductors, wherein the controllable bus terminator includes a voltage regulator, a plurality of termination networks, each having a first terminal and a second terminal wherein the second terminal of each of the termination networks provides an output terminal of the bus terminator. The bus terminator further includes a plurality of electrically controllable switches, each of the switches having a first port coupled to the voltage regulator and a second port coupled to the first terminal of a corresponding one of the termination networks wherein each of the switches couples the corresponding termination network to the voltage regulator when the corresponding switch is in a first state and wherein each of the switches disconnects the corresponding termination network from the voltage regulator when the corresponding switch is in a second state.

20 Claims, 3 Drawing Sheets

CONTROLLABLE BUS TERMINATOR

This application is a continuation of application Ser. No. 07/990,133, filed Dec. 14, 1992, now abandoned which is a continuation of application Ser. No. 07/755,072, filed Sep. 5, 1991 U.S. Pat. No. 5,272,396 filed Dec. 21, 1993.

FIELD OF THE INVENTION

The invention relates to the field of computer buses and specifically to the field of controllable terminators for computer buses.

BACKGROUND OF THE INVENTION

In a computer system, the processor, the memory, and the input/output (I/O) devices communicate with one another by way of a bus. A bus is a series of conductors, each of which is capable of transmitting signals which represent either data to be transferred between devices on the bus or control information, such as device addresses, which determine when and to where the data being transferred by the bus is to be transferred. The signals transferred on the bus typically take the form of rapidly changing bi-stable voltage levels. These voltage levels are placed on the conductors by bus drivers incorporated into each device which communicates with the bus. For optimum signal power transfer between devices and minimum signal reflection, the bus must be terminated in such a way that the impedance of the bus matches the impedance of the bus drivers. The bus impedance should be held approximately constant.

Generally, bus terminators take the form of modular devices. The bus terminator is physically inserted onto the bus to provide termination and physically removed from the bus to remove termination, for example, when the bus is to be extended. Such changing of the bus termination requires physical access to the bus, which in turn requires the opening of the enclosures protecting the devices and bus.

The present invention permits a bus terminator to be connected to and disconnected from a bus electrically and without being physically moved.

Another feature of the invention is that when the terminator is disconnected from the bus, its internal power supply is reduced substantially.

SUMMARY OF THE INVENTION

The invention relates to a controllable terminator for a computer bus which is capable of being electrically connected to and disconnected from the bus by means of a control signal.

The terminator includes a voltage regulator portion, a control portion and a series of bus terminating resistors, each of which is connected through a transistor switch for connecting each of the resistors to the regulated voltage. The voltage regulator portion includes a power-down circuit to turn the voltage regulator portion off, using the same control signal which disconnects the terminating resistors.

The control portion uses a single external signal voltage level both to cause the series of bus terminating transistor switches to switch and to cause the voltage regulator portion to turn on and off for reduced power consumption. In one embodiment, the control portion includes a comparator to determine the voltage level at which switching is to take place.

BRIEF DESCRIPTION OF THE DRAWING

These and other features and advantages of the invention will be more readily understood in view of the accompanying specification and drawings in which.

DESCRIPTION OF THE PREFERRED EMBODIMENT

Figure 1:
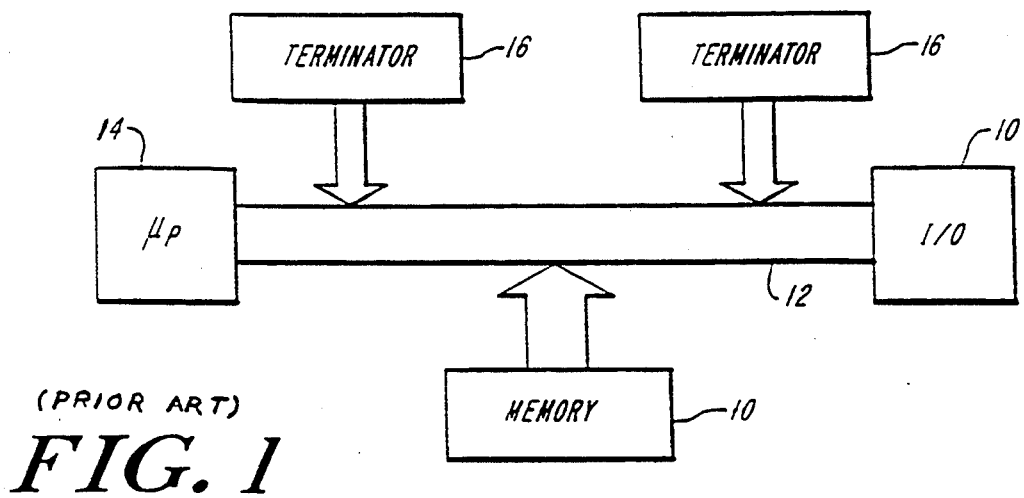
FIG. 1 is a diagram of a computer system utilizing a bus terminator known to the prior art.

Referring to FIG. 1, a computer system 10 includes a series of devices 10 each communicating with a processor 14 and one another over a bus 12. Each end of the bus 12 terminates at a terminator 16.

Figure 2:
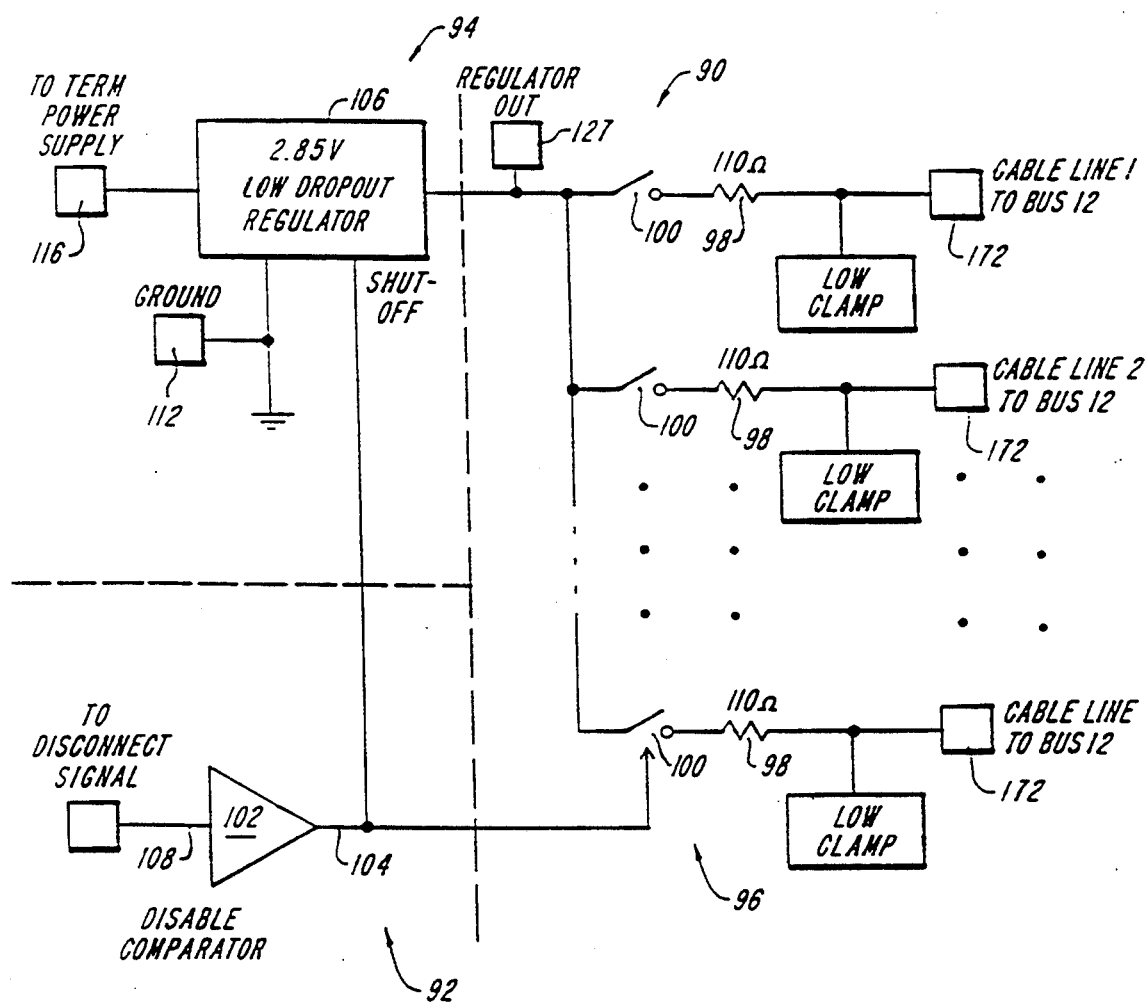
FIG. 2 is a block diagram of an embodiment of the invention.

Referring now to FIG. 2, in brief overview, an embodiment of the controllable terminator 90 of the invention can be roughly separated into a control portion 92, a voltage regulator portion 94 and a switching portion 96. The control portion 92 controls the connection of the bus 12, through a series of resistors 98, to the voltage regulation portion 94 by means of a series of switches 100 connected between the resistors 98 and the voltage regulation portion 94. In the embodiment shown, the control portion 92 includes a disconnect comparator 102 which produces a control voltage on its output terminal 104 in response to a disconnect control signal applied to one of its input terminals 106. When the disconnect control signal is high, the output signal of the comparator 102 opens the series of switches 100 and turns off the voltage regulator 106 of the voltage regulator portion 94. When the disconnect control signal is low, the voltage regulator portion 94 is activated and the switches 100 are closed, connecting the bus 12 to the voltage regulation portion 94 through the resistors 98. Thus the disconnect control signal permits the controllable terminator 90 to be connected or removed electrically from the bus 12 and the power supply 116, without being physically removed from the system.

Figure 3:
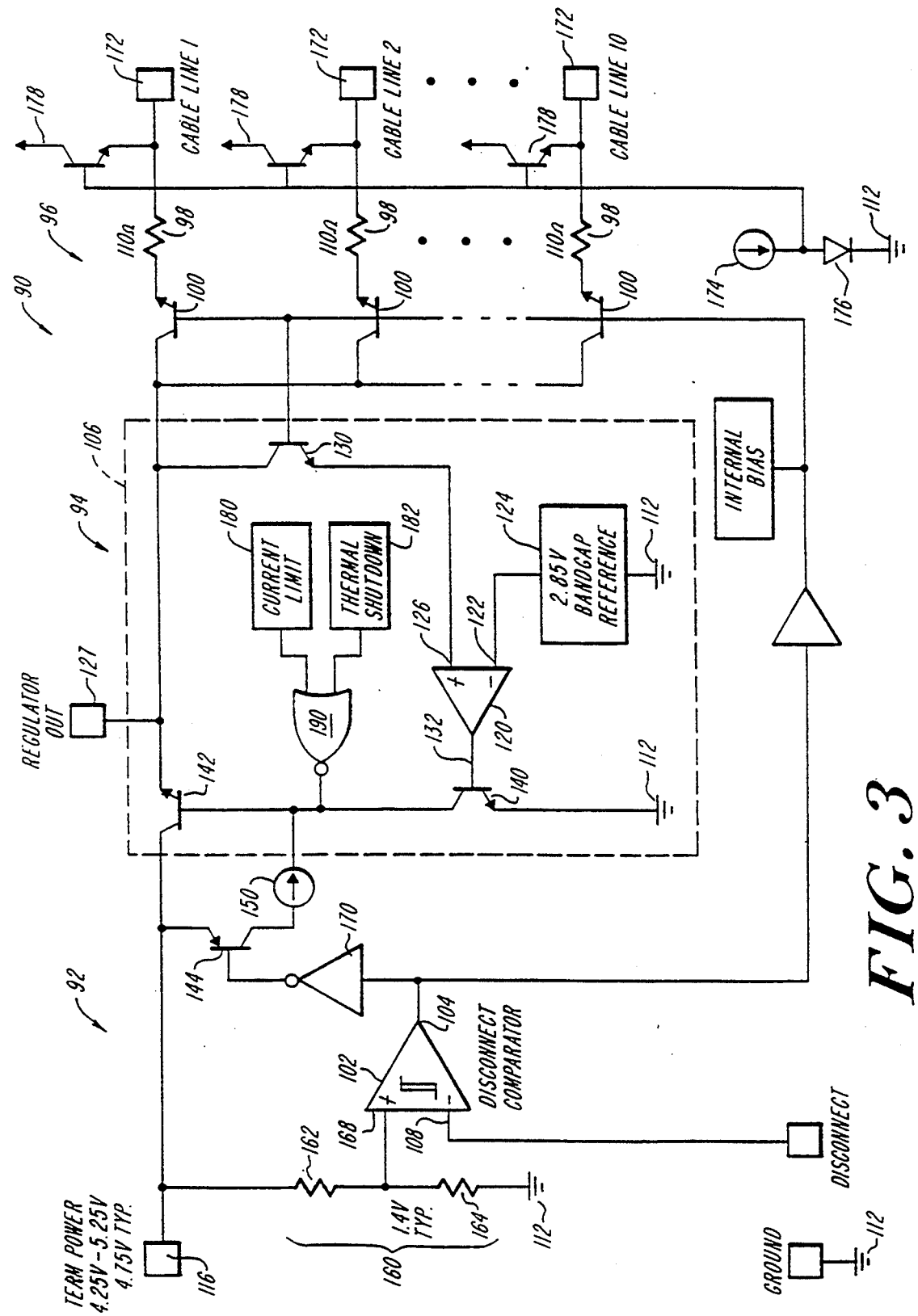
FIG. 3 is a schematic diagram of an embodiment of the invention shown in FIG. 2.

Referring now also to FIG. 3, the voltage regulator portion 94 includes a voltage differential amplifier 120 which has a first input terminal 122 connected to a bandgap reference 124. In the embodiment shown the bandgap reference 124 is set to 2.85 V, but other voltage references may be used to produce other voltage levels. A second input terminal 126 of the differential amplifier 120 is connected to the regulator output 127 through the transistor switch 130. Differential amplifier 120 works with transistor 140 and switchable current source 150 in order to control the conduction of power transistor 142 and thereby hold the regulator's output voltage constant in a manner well known in the art. Current source 150, which provides the bias current to power transistor 142 is connected to the power supply terminal 116 through transistor switch 144.

When transistor 144 is on, the current supply 150 provides bias current to the power transistor 142, subject to the degree of control provided by differential amplifier 120 and transistor 140. Conversely, when transistor 144 is off, the base current of transistor 142 is interrupted turning it off and causing both the regulator's output voltage to fall to zero volts and the internal power consumption to drop to substantially zero. The turning on and off of transistor 144 is controlled by the control portion 92 of the terminator 90 and will be discussed in more detail below.

The switching portion 96 of the terminator 90 includes a series of terminating resistors 98, each associated with a bus line 172 and the series of switching transistors 100, each associated with a respective resistor 98. A high control voltage applied to the base of each transistor 100 causes each to conduct, connecting its respective bus line 172 to the voltage regulator portion 94 through the resistors 98. Conversely, a low control voltage turns off each transistor 100, electrically disconnecting each bus line 172 from the voltage regulator and causing each bus connection 172 to appear as a high impedance to the bus 12.

The control portion 92 includes a voltage divider 160 which includes two resistors 162,164 connected between the power supply 116 and ground 112. The resistors 162,164 are selected so as to provide a defined voltage level to a first input terminal 168 of the disconnect comparator 102. In the embodiment shown, the power supply connected to terminal 116 is set for 4.75 V, the divider 160 establishes a threshold of 1.4 V at the first terminal 168 of the comparator 102. A voltage level applied to a second input terminal 108 of the comparator 102 is the disconnect control signal to connect or disconnect the terminator 90 from the bus 12.

In the embodiment shown, when the voltage of the disconnect signal at the second input terminal 106 of the disconnect comparator 102 is below 1.4 V, the signal on the output terminal 104 of the disconnect comparator 102 goes high. This signal is inverted by invertor 170 and applied to the base of transistor 144, turning it on. This permits current from the current source 150 to be applied to the base of power transistor 142 turning it on and permitting the feedback loop consisting of transistors 140,142 and differential amplifier 120 to regulate the voltage level. At the same time, the high signal on the output terminal 104 of disconnect comparator 102 is applied to the base of transistors 100 and 130, turning them on. The purpose of transistor 130 is to provide a voltage offset in the regulator feedback loop matching the voltage drop across each conducting transistor 100. The offset allows the regulator to hold the voltage of all terminating resistors 98 exactly equal to the regulator's reference voltage, with any variable voltage drop across transistor switches 100 cancelled by the voltage drop across transistor 130.

Conversely, when the signal voltage on the second input 108 of the disconnect comparator 102 goes above the voltage level on the first input 170, the output signal on the output terminal 104 of the disconnect comparator 102 goes low. This low signal is inverted to high by invertor 170 causing transistor 144 to shut off the voltage regulation portion 92 of the controllable terminator 90.

At the same time, the low output signal of the disconnect comparator 102 shuts off transistor 130 breaking the feedback loop to the comparator 102 from the power supply 116. The same signal which controls the voltage regulator portion 94 is also applied to the base of each transistor 100 causing each of the transistors 100 to turn off, electrically disconnecting each of the bus lines 172 from the terminator 90.

Additionally, each bus line 172 includes a voltage clamp which includes a transistor 178 and current source 174 connected through a diode 176 to ground 112. The base of clamp transistor 178 is connected between the current source 174 and diode 176, while the emitter of the transistor 178 is connected to the bus line 172. If the signal on the bus line 172 undergoes ringing and attempts to become negative because of signal reflection, transistor 178 conducts, clamping the voltage on the bus line 172 at zero volts.

It should also be noted that sensors producing signals indicative of over current 180 and overheating 182 are also incorporated in the circuit and provide input signals to a NOR gate 190. If either of these signals are present, the output signal from the NOR gate 190 goes low shutting off transistor 142 and thereby shutting off power to the terminator 90.

Figure 4:
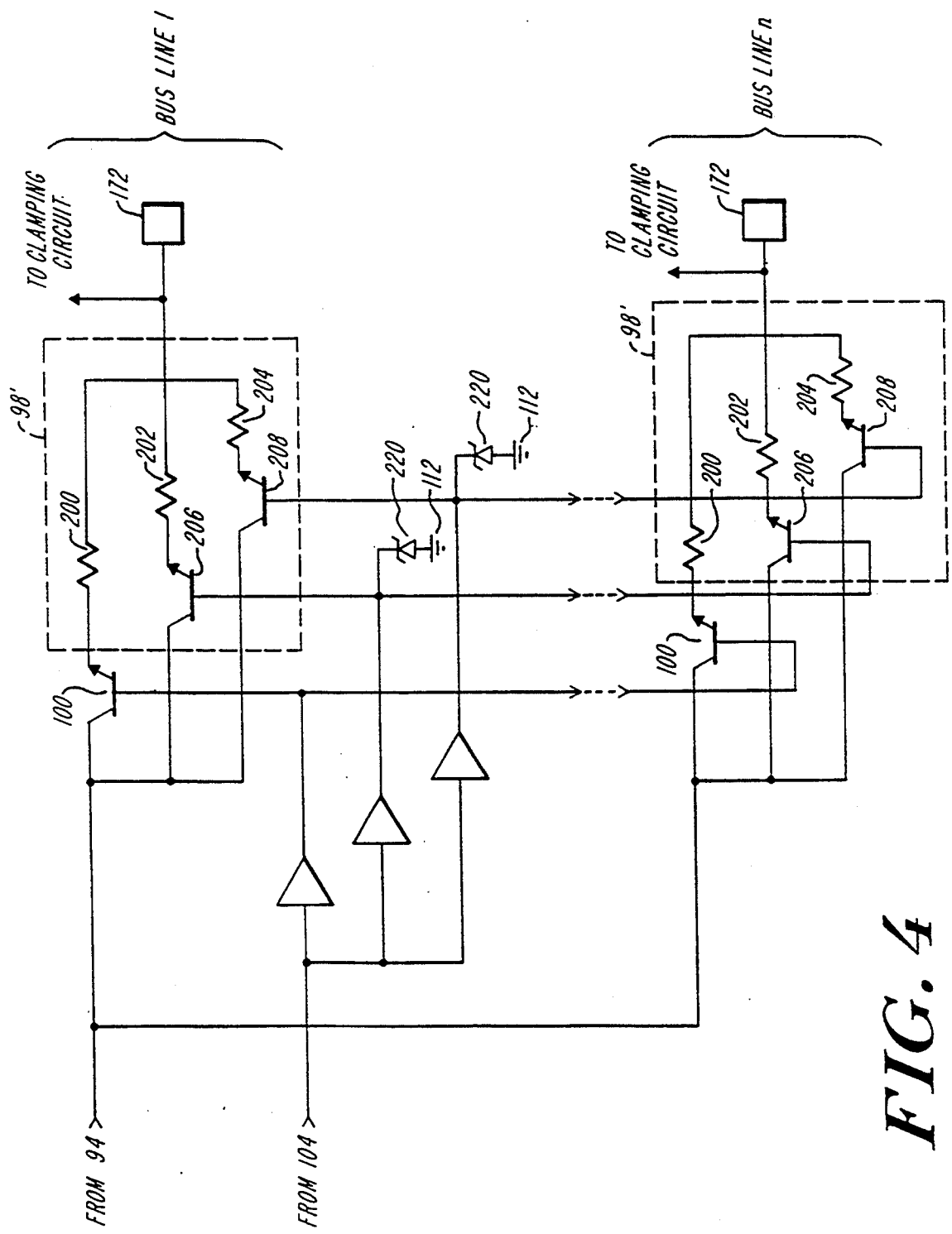
FIG. 4 is a schematic diagram of an embodiment of the switching portion of the embodiment of the invention shown in FIG. 3.

One embodiment of the controllable terminator 90 is constructed as a single chip integrated circuit having thin film resistors 98. In such an integrated circuit it is possible to trim the resistors 98 which would normally have a production tolerance of ±7.5% to within ±2.5% without increasing the control required in the manufacturing process. This is accomplished by the use of an additional circuit in the switching portion 96 of the controllable terminator 90. An embodiment of such a trimming circuit is shown in FIG. 4.

In this embodiment, each of the resistors 98 in the terminator 90 have been replaced by a transistor-resistor network 98'. In FIG. 4 only two transistor-resistor networks 98' have been shown for clarity, although each bus line 172 is connected to one. Each network 98' is constructed of three resistors 200,202,204 and two transistors 206,208. In the embodiment shown, the first resistor 200 has a nominal value of one hundred eighteen ohms while the second and third resistors 202,204 have nominal values of 1.15 k ohms and 2.3 k ohms, respectively. The transistors 206,208 are configured such that when the switching transistor 100 is turned on by the signal from the disconnect comparator output terminal 104, transistors 206,208 also turn on. This results in resistors 202 and 204 being connected in parallel with resistor 200, lowering the resistance experienced by the bus line 172.

A zener diode 220 is also connected between the base of each transistor 202,204 and ground 112. During fabrication, the resistance of the entire network 98' is determined and may be adjusted by pulsing a high current through one or both of the zener diodes 220, shorting them to ground 112. The result of the shorting of a zener diode 220 to ground 112 is that the base of its respective transistor 206 or 208 is also grounded, shutting off the transistor 206 or 208. The shutting off of transistor 206 removes resistor 202 from the network 98' thereby increasing the resistance of the network 98'. Similarly, the shutting off of transistor 208 removes resistor 204 from the network 98' further increases the resistance of the network 98'. By selectively removing one or both of the zener diodes 220, the total network resistance may be adjusted to a close tolerance. Since each thin film resistor in a network 98' is well matched by its corresponding resistor in another network 98' on the same integrated circuit chip, only one measurement need be made on one network 98' to determine the total resistance of all networks 98' in the terminator 90.

Correspondingly, since all network resistors 200,202,204 are matched within a chip, the trimming of one resistor network to a specific resistance trims all resistor networks on that chip. Therefore only one zener diode 220 need be fabricated on the chip for each resistor 202,204, in the network 98', not one zener diode 220 for each resistor 202, 204 for each network 98'. That is, in the embodiment shown, only two zener diodes 220 (one for resistors 202 and one for resistors 204) are fabricated on the chip, regardless of how many networks 98' are fabricated on the chip. Thus trimming one network 98' trims all networks 98' in the terminator 90 and no decrease in manufacturing tolerance is required for the thin film resistors 98 in order to assure that the specification of each terminator resistance is met. It is understood that other modifications or embodiments are possible which will still be within the scope of the appended claims. These and other examples of the concept of the invention illustrated above are intended by way of example and the actual scope of the invention is to be determined solely from the following claims.

We claim:

1. A controllable bus terminator, for providing a switchable termination on a bus having a plurality of conductors, said controllable bus terminator comprising:
   a voltage regulator;
   a plurality of termination networks;
   a plurality of electrically controllable switches, each of said switches, said voltage regulator, and a corresponding one of said termination networks being coupled in series, wherein each of said switches couples the voltage regulator to a corresponding conductor through said termination network when the corresponding switch is in a first state and wherein each of said switches disconnects the voltage regulator from said corresponding conductor when the corresponding switch is in a second state;
   a control circuit comprising an output terminal coupled to each of said plurality of electrically controllable switches, said control circuit for providing a first control signal which causes each of said electrically controllable switches to switch from said first state to said second state and for providing a second control signal which causes each of said electrically controllable switches to switch from said second state to said first state; and
   wherein the output terminal of said control circuit is coupled to said voltage regulator and wherein a first one of said first and second control signals turns on said voltage regulator and a second one of said first and second control signals turns off said voltage regulator.

2. The controllable bus terminator recited in claim 1 wherein each of said plurality of termination networks comprises a resistor.

3. A controllable bus terminator, for providing a switchable termination on a bus having a plurality of conductors, said controllable bus terminator comprising:
   a voltage regulator;
   a plurality of termination networks, each of said termination networks having a first terminal and a second terminal;
   a plurality of electrically controllable switches, each of said switches coupling the voltage regulator to a corresponding conductor through a corresponding termination network when said switch is in a first state and wherein each of said switches disconnects the voltage regulator from said corresponding conductor when said switch is in a second state; and
   a plurality of clamping circuits, each of said clamping circuits having a terminal coupled to the one of said first and second terminals of a corresponding one of said termination networks that is coupled to said corresponding one of said plurality of conductors when said switch is in said first state.

4. The controllable bus terminator recited in claim 3 wherein each of said plurality of termination networks comprises a resistor.

5. A controllable bus terminator, for providing a switchable termination on a bus having a plurality of conductors, said controllable bus terminator comprising:
   a voltage regulator;
   a plurality of termination networks, each one having a first terminal and a second terminal;
   a like plurality of switches, each of said switches being coupled in series between said voltage regulator and a corresponding one of said termination networks wherein, in a first bias state, each of said switches provides a first signal path having a substantially short circuit impedance characteristic between the corresponding termination network and the voltage regulator and wherein, in a second bias state, each of said switches provides a second signal path having a substantially open circuit impedance characteristic between the corresponding termination network and the voltage regulator; and
   a like plurality of clamping circuits, each of said clamping circuits having a terminal coupled to one of said first and second terminals of a corresponding termination network.

6. The controllable bus terminator recited in claim 5 wherein each of said plurality of termination networks comprises a resistor.

7. A controllable bus terminator having an impedance, for providing a switchable termination on a bus having a plurality of conductors, said controllable bus terminator comprising:
   a voltage regulator;
   a plurality of electrically controllable switches, each of said switches coupled in series with said voltage regulator and a corresponding one of said plurality of conductors, wherein each of said switches couples the corresponding conductor to said voltage regulator when the corresponding switch is in a first state and wherein each of said switches disconnects the corresponding conductor from said voltage regulator when the corresponding switch is in a second state;
   a control circuit comprising an output terminal coupled to each of said plurality of electrically controllable switches, said control circuit for providing a first control signal which causes each of said electrically controllable switches to switch from said first state to said second state and for providing a second control signal which causes each of said electrically controllable switches to switch from said second state to said first state; and
   wherein the output terminal of said control circuit is coupled to said voltage regulator and wherein a first one of said first and second control signals turns on said voltage regulator and a second one of said first and second control signals turns off said voltage regulator.

8. The controllable bus terminator recited in claim 7 wherein said control circuit comprises a comparator having an input terminal and an output terminal, said comparator for comparing a voltage level of a first signal fed to the input terminal of said comparator to a predetermined threshold voltage and wherein said comparator provides said first control signal to cause said electrically controllable switches to switch from said first state to said second state in response to whether the voltage level of said first signal exceeds said predetermined threshold voltage.

9. The controllable bus terminator recited in claim 7 further comprising a plurality of termination networks, each one being coupled in series with a corresponding one of said plurality of electrically controllable switches, said voltage regulator, and a corresponding one of said conductors, wherein each of said switches couples the corresponding conductor to said voltage regulator through the corresponding termination network when said switch is in said first state.

10. The controllable bus terminator recited in claim 9 wherein each of said plurality of termination networks comprises a resistor.

11. A controllable bus terminator having an impedance, for providing a switchable termination on a bus having a plurality of conductors, said controllable bus terminator comprising:
  a voltage regulator;
  a plurality of electrically controllable switches, each of said switches coupled in series with said voltage regulator and a corresponding one of said conductors, wherein each of said switches couples the corresponding conductor to said voltage regulator when the corresponding switch is in a first state and wherein each of said switches disconnects the corresponding conductor from said voltage regulator when the corresponding switch is in a second state; and
  a plurality of clamping circuits, each of said clamping circuits having a terminal coupled to a corresponding one of said conductors.

12. The controllable bus terminator recited in claim 11 further comprising a plurality of termination networks, each one being coupled in series with a corresponding one of said plurality of electrically controllable switches, said voltage regulator, and a corresponding one of said conductors, wherein each of said switches couples the corresponding conductor to said voltage regulator through the corresponding termination network when said switch is in said first state.

13. The controllable bus terminator recited in claim 12 wherein each of said plurality of termination networks comprises a resistor.

14. A bus terminator for terminating a bus including a plurality of conductors, each of Said conductors having a first end and a second end and a dynamic characteristic impedance related to the inductance and capacitance of said conductor between said first and second ends, said bus terminator comprising:
  a voltage regulator having a first terminal;
  a like plurality of switches, each of said switches being coupled in series with said voltage regulator and said first end of a corresponding one of said conductors wherein, in a first bias state, each of said switches provides a first signal path having first impedance corresponding to said dynamic characteristic impedance, said signal path being coupled between the corresponding conductor and the voltage regulator and wherein, in a second bias state, each of said switches provides a second signal path having a second impedance characteristic, said signal path being coupled between the corresponding conductor and the voltage regulator; and
  a like plurality of clamping circuits, each of said clamping circuits having a terminal coupled to the first end of a corresponding one of said conductors.

15. The controllable bus terminator recited in claim 14 wherein said second impedance characteristic corresponds to a substantially open circuit impedance.

16. The controllable bus terminator recited in claim 14 further comprising a plurality of termination networks, each one being coupled in series with a corresponding one of said plurality of switches, said voltage regulator, and a corresponding one of said conductors, wherein each of said switches couples the corresponding conductor to said voltage regulator through the corresponding termination network when said switch is in said first bias state.

17. The controllable bus terminator recited in claim 16 wherein each of said plurality of termination networks comprises a resistor.

18. A bus terminator for terminating a bus including a plurality of conductors, each one having a dynamic characteristic impedance associated therewith related to the inductance and capacitance of said conductor, said bus terminator comprising:
  a voltage regulator having a feedback loop including a series connected transistor and a differential amplifier; and
  a plurality of switches, each switch being coupled between said voltage regulator and a corresponding one of said conductors so that when said switch is in a first state, the corresponding conductor is terminated by an impedance corresponding to said dynamic characteristic impedance and said series connected transistor and each of said switch have substantially matching voltage drops and when said switch is in a second state, the corresponding conductor is decoupled from said voltage regulator.

19. The bus terminator recited in claim 18 further comprising a comparator providing a control signal for opening said switches to couple said conductors to said voltage regulator for closing said switches to decouple said conductors from said voltage regulator.

20. The bus terminator recited in claim 19 wherein said comparator further provides a control signal for turning off said voltage regulator when said conductors are decoupled from said voltage regulator and for turning on said voltage regulator when said conductors are coupled to said voltage regulator.

* * * * *

UNITED STATES PATENT AND TRADEMARK OFFICE
CERTIFICATE OF CORRECTION

PATENT NO. : 5,338,979

DATED : August 16, 1994

INVENTOR(S) : Robert A. Mammano, et al.

It is certified that error appears in the above-indentified patent and that said Letters Patent is hereby corrected as shown below:

Column 7, line 49, "of Said" should read --of said--.

Column 8, line 42, "said switch" should read --said switches--.

Signed and Sealed this

Second Day of April, 1996

Attest:

BRUCE LEHMAN

Attesting Officer            Commissioner of Patents and Trademarks

REEXAMINATION CERTIFICATE (2798th)

United States Patent [19]
Mammano et al.

[11] B1 5,338,979
[45] Certificate Issued Feb. 13, 1996

[54] CONTROLLABLE BUS TERMINATOR

[75] Inventors: Robert A. Mammano, Costa Mesa, Calif.; Mark Jordan, Manchester, N.H.

[73] Assignee: Unitrode Corporation, Billerica, Mass.

Reexamination Request:
No. 90/003,672, Dec. 23, 1994

Reexamination Certificate for:
Patent No.: 5,338,979
Issued: Aug. 16, 1994
Appl. No.: 88,911
Filed: Jul. 7, 1993

Related U.S. Application Data

[63] Continuation of Ser. No. 990,133, Dec. 14, 1992, abandoned, which is a continuation of Ser. No. 755,072, Sep. 5, 1991, Pat. No. 5,272,396.

[51] Int. Cl.$^6$ .......................... H03K 17/16; H03K 3/01
[52] U.S. Cl. ........................ 326/30; 326/82; 327/530

[56] References Cited

U.S. PATENT DOCUMENTS

| | | | |
|---|---|---|---|
| 4,015,147 | 3/1977 | Davidson et al. | 307/304 |
| 4,748,426 | 5/1988 | Stewart | 333/22 |
| 4,920,339 | 4/1990 | Friend et al. | 340/825 |
| 5,029,284 | 7/1991 | Feldbaumer et al. | 307/443 |

OTHER PUBLICATIONS

"Push SCSI Performance to the Limit", Paul Boulay, Kurt Chan, and James E. Schuessler, Electronic Design, May 10, 1990, pages 85-92.

"Linear Technology Corporation Linear Databook 1990", Linear Technology Corporation, 1989. (Enclosed Exhibit 1)

"Linear Technology Corporation Linear Databook Supplement 1988", Linear Technology Corporation, 1987. (Enclosed Exhibit 2)

"Linear Technology LT1086/LT1086-5/LT1086-12" (which is a specification sheet for the LT1086/LT1086-5/LT1086-12, Linear Technology Corporation, November, 1988. (Enclosed Exhibit 3)

*Primary Examiner*—Edward P. Westin

[57] ABSTRACT

A controllable bus terminator for providing a switchable termination on a bus having a plurality of conductors, wherein the controllable bus terminator includes a voltage regulator, a plurality of termination networks, each having a first terminal and a second terminal wherein the second terminal of each of the termination networks provides an output terminal of the bus terminator. The bus terminator further includes a plurality of electrically controllable switches, each of the switches having a first port coupled to the voltage regulator and a second port coupled to the first terminal of a corresponding one of the termination networks wherein each of the switches couples the corresponding termination network to the voltage regulator when the correpsonding switch is in a first state and wherein each of the switches disconnects the corresponding termination network from the voltage regulator when the corresponding switch is in a second state.

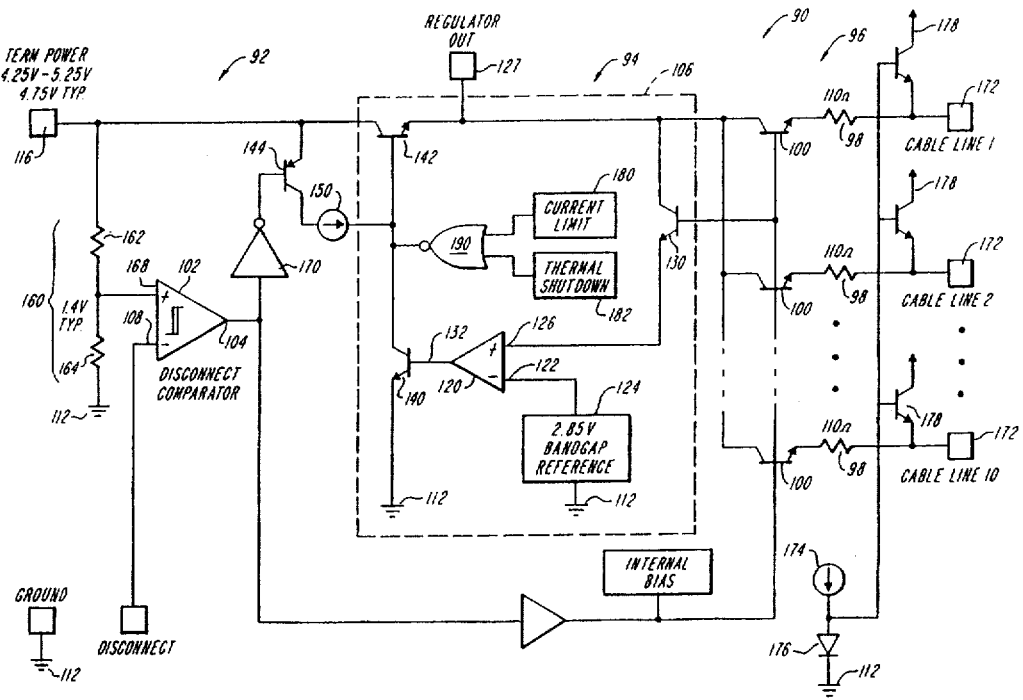

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 18–20 is confirmed.

Claims 3–6 and 11–17 are cancelled.

Claims 1, 7 and 8 are determined to be patentable as amended.

Claims 2 and 9–10, dependent on an amended claim, are determined to be patentable.

1. A controllable bus terminator, for providing a switchable termination on a bus having a plurality of conductors, said controllable bus terminator comprising:

a voltage regulator;

a plurality of termination networks;

a plurality of electrically controllable switches *each of which has an input terminal, and output terminal, and a control terminal*, each of said switches, said voltage regulator, and a coresponding one of said termination networks being coupled in series *with the input terminal of each said switch being connected to said voltage regulator and the output terminal of each said switch being coupled to the corresponding one of said termination networks*, wherein each of said switches couples the voltage regulator to a corresponding conductor through said termination network when the corresponding switch is in a first state and wherein each of said switches disconnects the voltage regulator from said corresponding conductor when the corresponding switch is in a second state;

a control circuit comprising an output terminal coupled to the control terminal of each of said plurality of electrically controllable switches, said control circuit for providing a first control signal *to said control terminals* which causes each of said electrically controllable switches to switch from said first state to said second state and for providing a second control signal *to said control terminals* which causes each of said electrically controllable switches to switch from said second state to said first state; and wherein the output terminal of said control circuit is coupled to said voltage regulator and wherein a first one of said first and second control signals turns on said voltage regulator and a second one of said first and second control signals turns off said voltage regulator.

7. A controllable bus terminator having an impedance, for providing a switchable termination on a bus having a plurality of conductors, said controllable bus terminator comprising:

a voltage regulator;

a plurality of electrically controllable switches *each of which has an input terminal, an output terminal, and a control terminal,* each of said switches coupled in series with said voltage regualtor and a corresponding one of said plurality of conductors *with the input termianl of the switch connected to said voltage regulator and the output terminal of the switch connected to the corresponding one of said plurality of conductors*, wherein each of said switches couples the corresponding conductor to said voltage regulator when the corresponding switch is in a first state and wherein each of said switches disconnects the corresponding conductor from said voltage regulator when the corresponding switch is in a second state;

a control circuit comprising an output terminal coupled to *said control terminal of* each of said plurality of electrically controllable switches, said control circuit for providing a first control signal *to said control terminals* which causes each of said electrically controllable switches to switch from said first state to said second state and for providing a second control signal *to said control terminals* which causes each of said electrically controllable switches to switch from said second state to said first state; and wherein the output terminal of said control circuit is coupled to said voltage regulator and wherein a first one of said first and second control signals turns on said voltage regulator and a second one of said first and second control signals truns off said voltage regulator.

8. *A controllable bus terminator having an impedance, for providing a switchable termination on a bus having a plurality of conductors, said controllable bus terminator comprising:*

*a voltage regulator;*

*a plurality of electrically controllable switches, each of said switches coupled in series with said voltage regulator and a corresponding one of said plurality of conductors, wherein each of said switches couples the corresponding conductor to said voltage regulator when the corresponding switch is in a first state and wherein each of said switches disconnects the corresponding conductor from said voltage regulator when the corresponding switch is in a second state;*

*a control circuit comprising an output terminal coupled to each of said plurality of electrically controllable switches, said control circuit for providing a first control signal which causes each of said electrically controllable switches to switch from said first state to said second state and for providing a second control signal which causes each of said electrically controllable switches to switch from said second state to said first state; and*

*wherein the output terminal of said control circuit is coupled to said voltage regulator and wherein a first one of said first and second control signals turns on said voltage regulator and a second one of said first and second control signals turns off said voltage regulator,*

[The controllable bus terminator recited in claim 7 wherein]

said control circuit [comprises] *further comprising* a comparator having an input terminal and an output terminal, said comparator for comparing a voltage level of a first signal fed to the input terminal of said comparator to a predetermined thereshold voltage and wherein said comparator provides said first control signal to cause said electrically controllable switches to switch from said first state to said second state in response to whether the voltage level of said first signal exceeds said predetermined thereshold voltage.

* * * * *

REEXAMINATION CERTIFICATE (3065th)

United States Patent [19]
Mammano et al.

[11] B2 5,338,979
[45] Certificate Issued Nov. 26, 1996

[54] CONTROLLABLE BUS TERMINATOR

[75] Inventors: Robert A. Mammano, Costa Mesa, Calif.; Mark Jordan, Manchester, N.H.

[73] Assignee: Unitrode Corporation, Billerica, Mass.

Reexamination Request:
No. 90/004,080, Dec. 20, 1995

Reexamination Certificate for:
| | |
|---|---|
| Patent No.: | 5,338,979 |
| Issued: | Aug. 16, 1994 |
| Appl. No.: | 88,911 |
| Filed: | Jul. 7, 1993 |

Reexamination Certificate B1 5,338,979 issued Feb. 13, 1996

Certificate of Correction issued Apr. 2, 1996.

Related U.S. Application Data

[63] Continuation of Ser. No. 990,133, Dec. 14, 1992, abandoned, which is a continuation of Ser. No. 755,072, Sep. 5, 1991, Pat. No. 5,272,396.

[51] Int. Cl.[6] ............................ H03K 17/16; H03K 3/01
[52] U.S. Cl. ........................ 326/30; 326/82; 327/530

[56] References Cited

U.S. PATENT DOCUMENTS

| | | | |
|---|---|---|---|
| 5,381,034 | 1/1995 | Thrower et al. | 257/529 |
| 5,382,841 | 1/1995 | Feldbaumer | 326/30 |

OTHER PUBLICATIONS

"Analog IC Data Book 1988", referred to as the PMI 1988 Linear Data Book, pp. 8-3 to 8-5 and pp. 8-43 to 8-50. (Enclosed Exhibit 4).

"The Theory and Practice of Microelectronics", Sorab K, Ghandhi, John Wiley & Sons, Inc., 1968, pp. 380–389. (Enclosed Exhibit 5).

"February, 1989 X3T9.2 SCSI Committee Meeting Minutes", Entry posted Jan. 3, 1990 on SCSI Committee Electronic Bulletin Board. (Enclosed Exhibit 6).

"Encyclopedia of Electronics and Computers", Sybil P. Parker, Editor in Chief, McGraw-Hill Book Company, 1984, pp. 142–143.

"The Art of Electronics, Second Edition", Paul Horowitz, Cambridge University Press, 1980, 1989, pp. 577–582.

"Analog Integrated Circuits", J. A. Conneley, Contributing Editor, John Wiley & Sons, 1975, pp. 119–139.

*Primary Examiner*—Edward Westin

[57] ABSTRACT

A controllable bus terminator for providing a switchable termination on a bus having a plurality of conductors, wherein the controllable bus terminator includes a voltage regulator, a plurality of termination networks, each having a first terminal and a second terminal wherein the second terminal of each of the termination networks provides an output terminal of the bus terminator. The bus terminator further includes a plurality of electrically controllable switches, each of the switches having a first port coupled to the voltage regulator and a second port coupled to the first terminal of a corresponding one of the termination networks wherein each of the switches couples the corresponding termination network to the voltage regulator when the corresponding switch is in a first state and wherein each of the switches disconnects the corresponding termination network from the voltage regulator when the corresponding switch is in a second state.

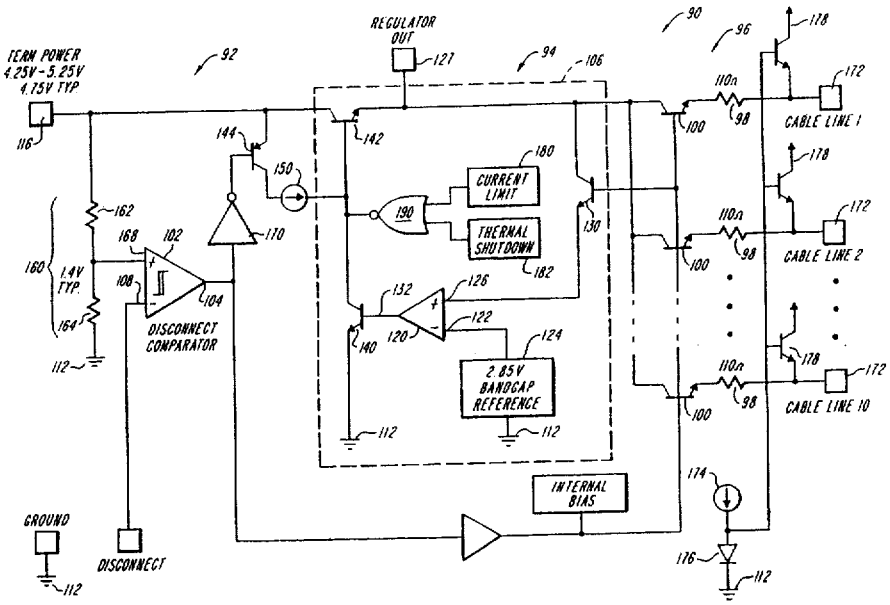

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 2, 7–10 and 18–20 is confirmed.

Claims 3–6 and 11–17 were previously cancelled.

* * * * *